(12) United States Patent
Wang et al.

(10) Patent No.: US 11,183,220 B2
(45) Date of Patent: Nov. 23, 2021

(54) METHODS AND APPARATUS FOR TEMPORAL TRACK DERIVATIONS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/589,906

(22) Filed: Oct. 1, 2019

(65) Prior Publication Data

US 2020/0111510 A1   Apr. 9, 2020

Related U.S. Application Data

(60) Provisional application No. 62/740,473, filed on Oct. 3, 2018.

(51) Int. Cl.
*G11B 27/036* (2006.01)
*H04N 19/31* (2014.01)
(Continued)

(52) U.S. Cl.
CPC .......... *G11B 27/036* (2013.01); *G11B 27/002* (2013.01); *G11B 27/06* (2013.01);
(Continued)

(58) Field of Classification Search
CPC ..... G11B 27/036; G11B 27/06; G11B 27/002; H04N 19/31; H04N 21/816;
(Continued)

(56) References Cited

U.S. PATENT DOCUMENTS 8,488,943 B1 * 7/2013 Sharifi .................... H04N 5/91
386/282
2010/0153395 A1   6/2010 Hannuksela et al.
(Continued)

FOREIGN PATENT DOCUMENTS

TW   201836358 A   10/2018

OTHER PUBLICATIONS

[No Author Listed], Information technology—Coded representation of immersive media (MPEG-I)—Part 2: Omnidirectional media format. ISO/IEC JTC1/SC29/WG11. Dec. 11, 2017:178 pages.
(Continued)

*Primary Examiner* — Loi H Tran
(74) *Attorney, Agent, or Firm* — Wolf, Greenfield & Sacks, P.C.

(57) ABSTRACT

The techniques described herein relate to methods, apparatus, and computer readable media configured to access multimedia data that has a hierarchical track structure that includes at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The temporal track derivation operation is performed on a set of media units comprising at least the first sequence of temporally-related media units to temporally modify the set of media units to generate second media data for the second track, wherein the second media data comprises a second sequence of temporally-related media units from the set of media units.

22 Claims, 8 Drawing Sheets

(51) Int. Cl.
  *H04N 21/81* (2011.01)
  *G11B 27/06* (2006.01)
  *H04N 21/218* (2011.01)
  *G11B 27/00* (2006.01)
(52) U.S. Cl.
  CPC ....... *H04N 19/31* (2014.11); *H04N 21/21805* (2013.01); *H04N 21/816* (2013.01)
(58) Field of Classification Search
  CPC ..... H04N 21/21805; H04N 21/234327; H04N 21/85406
  USPC .......................................................... 386/278
  See application file for complete search history.

(56) References Cited

U.S. PATENT DOCUMENTS

| | | | |
|---|---|---|---|
| 2013/0170561 | A1 | 7/2013 | Hannuksela |
| 2018/0184098 | A1* | 6/2018 | Denoual ............... H04N 19/587 |
| 2018/0199044 | A1 | 7/2018 | Wang et al. |
| 2019/0075148 | A1* | 3/2019 | Nielsen ............... H04N 21/2668 |
| 2019/0173935 | A1* | 6/2019 | Lohmar ................ H04L 69/163 |
| 2020/0099997 | A1* | 3/2020 | Denoual ........ H04N 21/234345 |
| 2020/0219536 | A1 | 7/2020 | Wang et al. |

OTHER PUBLICATIONS

Park et al., Use cases and requirements for NBMP (v4). International Organisation for Standardisation, Coding of Moving Pictures and Audio, ISO/IEC JTC1/SC29/WG11 MPEG2018/N17502. Apr. 2018:31 pages.

Singer et al., Technologies under Consideration for ISOBMFF. International Organisation for Standardisation, Coding of Moving Pictures and Audio, ISO/IEC JTC1/SC29/WG11 MPEG2018/N17575. Apr. 2018:53 pages.

Wang et al., Deriving Composite Tracks in ISOBMFF using Track Grouping Mechanisms. International Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

Wang et al., Media Processing related Track Derivations in ISOBMFF. International Organisation for Standardisation, Coding of Moving Pictures and Audio, ISO/IEC JTC1/SC29/WG11 MPEG2016/M44800. Oct. 2018:16 pages.

[No Author Listed], Information technology—Coding of audio-visual objects—Part 12: ISO base media file format. ISO/IEC 14496-12, Fifth Edition. Feb. 5, 2015: 256 pages.

Wang et al., Temporal Track Derivations in ISOBMFF. International Organisation For Standardisation, Coding of Moving Pictures and Audio, ISO/IEC JTC1/SC29/WG11, MPEG2016/M44801. Oct. 2018: 5 pages.

* cited by examiner

METHODS AND APPARATUS FOR TEMPORAL TRACK DERIVATIONS

RELATED APPLICATIONS

This Application claims priority under 35 U.S.C. § 119(e) to 62/740,473, filed Oct. 3, 2018, and entitled "METHOD OF TEMPORAL TRACK DERIVATIONS IN ISOBMFF," which is hereby incorporated by reference in its entirety.

TECHNICAL FIELD

The techniques described herein relate generally to temporal track derivations.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for using track derivations for network based media processing.

Some embodiments relate to a method implemented by at least one processor in communication with a memory, wherein the memory stores computer-readable instructions that, when executed by the at least one processor, cause the at least one processor to perform accessing multimedia data comprising a hierarchical track structure comprising at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The computer-readable instructions cause the at least one processor to perform the temporal track derivation operation on a set of media units comprising at least the first sequence of temporally-related media units to temporally modify the set of media units to generate second media data for the second track, wherein the second media data comprises a second sequence of temporally-related media units from the set of media units.

In some examples, the metadata specifies an operation to add media data, the hierarchical track structure further comprises a third track at a third level below the second level comprising third media data. The third media data comprises a third sequence of temporally-related media units, the set of media units further comprises the third sequence of temporally-related media units, and performing the temporal track derivation operation on the set of media units comprises combining the first sequence of temporally-related media units and the third sequence of temporally-related media units to generate the second sequence of temporally-related media units. The metadata can specify a splicing operation, and combining comprises joining the first sequence of temporally-related media units and the third sequence of temporally-related media units to generate the second sequence of temporally-related media units. The metadata can specify an insertion operation comprising an insertion time, and combining comprises splitting the first sequence of temporally-related media units at the insertion time into a first portion and a second portion, and joining the first portion, the third sequence of temporally-related media units, and the second portion, so that the third sequence of temporally-related media units is between the first portion and the second portion.

In some examples, the metadata specifies an operation to remove a set of one or more media units, and performing the temporal track derivation operation on the set of media units comprises removing the set of one or more media units from the first sequence of temporally-related media units to generate the second sequence of temporally-related media units. The metadata can specify a trim operation comprising a trim time specifying the set of one or more media units, and removing the set of one or more media units from the first sequence of temporally-related media units comprises removing the set of one or more media units from a beginning portion or an end portion of the first sequence of temporally-related media units. The metadata can specify a cut operation comprising a first and second cut time, and removing the set of one or more media units from the first sequence of temporally-related media units comprises removing the set of one or more media units from a middle portion of the first sequence of temporally-related media units between the first and second cut times.

In some examples, performing the temporal track derivation operation on the set of media units comprises generating third media data for a third track, the third media data comprising a third sequence of temporally-related media units. The metadata can specify a split operation comprising a split time, and generating the second media data and the third media data comprises splitting the first sequence of temporally-related media units at the split time into a first portion and a second portion, wherein the second media data comprises the first portion and the third media data comprises the second portion.

In some examples, the metadata specifies a time change operation, and performing the temporal track derivation operation on the set of media units comprises changing a time aspect of the first sequence of temporally-related media units to generate the second sequence of temporally-related media units.

Some embodiments relate to an apparatus comprising a processor in communication with memory, the processor being configured to execute instructions stored in the memory that cause the processor to perform accessing multimedia data comprising a hierarchical track structure comprising at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The instructions cause the processor to perform the temporal track derivation operation on a set of media units comprising at least the first sequence of temporally-related media units to temporally modify the set of media units to generate second media data for the second track, wherein the second media data comprises a second sequence of temporally-related media units from the set of media units.

In some examples, the metadata specifies an operation to add media data, the hierarchical track structure further comprises a third track at a third level below the second level comprising third media data, wherein the third media data comprises a third sequence of temporally-related media units, and the set of media units further comprises the third sequence of temporally-related media units. The temporal track derivation operation can be performed on the set of media units comprises combining the first sequence of temporally-related media units and the third sequence of temporally-related media units to generate the second sequence of temporally-related media units. The metadata can specify a splicing operation, and combining comprises joining the first sequence of temporally-related media units and the third sequence of temporally-related media units to generate the second sequence of temporally-related media units. The metadata can specify an insertion operation comprising an insertion time, and combining can include splitting the first sequence of temporally-related media units at the insertion time into a first portion and a second portion, and joining the first portion, the third sequence of temporally-related media units, and the second portion, so that the third sequence of temporally-related media units is between the first portion and the second portion.

In some examples, the metadata specifies an operation to remove a set of one or more media units, and performing the temporal track derivation operation on the set of media units comprises removing the set of one or more media units from the first sequence of temporally-related media units to generate the second sequence of temporally-related media units. The metadata can specify a trim operation comprising a trim time specifying the set of one or more media units, and removing the set of one or more media units from the first sequence of temporally-related media units comprises removing the set of one or more media units from a beginning portion or an end portion of the first sequence of temporally-related media units. The metadata can specify a cut operation comprising a first and second cut time, and removing the set of one or more media units from the first sequence of temporally-related media units comprises removing the set of one or more media units from a middle portion of the first sequence of temporally-related media units between the first and second cut times.

In some examples, performing the temporal track derivation operation on the set of media units comprises generating third media data for a third track, the third media data comprising a third sequence of temporally-related media units. The metadata can specify a split operation comprising a split time, and generating the second media data and the third media data comprises splitting the first sequence of temporally-related media units at the split time into a first portion and a second portion, wherein the second media data comprises the first portion and the third media data comprises the second portion.

In some examples, the metadata specifies a time change operation, and performing the temporal track derivation operation on the set of media units comprises changing a time aspect of the first sequence of temporally-related media units to generate the second sequence of temporally-related media units.

Some embodiments relate to at least one computer readable storage medium storing processor-executable instructions that, when executed by at least one processor, cause the at least one processor to perform accessing multimedia data comprising a hierarchical track structure comprising at least a first track at a first level of the hierarchical track structure comprising first media data, wherein the first media data comprises a first sequence of temporally-related media units, and a second track at a second level in the hierarchical track structure that is different than the first level of the first track, the second track comprising metadata specifying a temporal track derivation operation. The instructions cause the at least one processor to perform the temporal track derivation operation on a set of media units comprising at least the first sequence of temporally-related media units to temporally modify the set of media units to generate second media data for the second track, wherein the second media data comprises a second sequence of temporally-related media units from the set of media units.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

The ISO Base Media File Format (ISOBMFF) provides for track derivations in which generally one or more input tracks are processed to generate an output/derived track. However, the inventors have discovered and appreciated that existing track derivations only provide for spatial processing of input tracks. For example, spatial track derivations include image manipulation (e.g., such as rotation, dissolve and ROI selection) and spatial composition (e.g., such as overlay composition, track grid composition and sub-picture track composition) of input tracks. The inventors have therefore discovered and appreciated that none of the track derivations provide for, or support, temporal processing, such as processing of temporal samples. The techniques described herein provide for track derivations in the temporal domain that can be used to process temporal sequences of contiguous samples, such as samples in the forms of chucks, fragments, segments, sections, and/or the like, which come from the input tracks of the track derivation operation. Examples of such temporal processing include adding and/or removing multimedia content, modifying the speed of the multimedia content, modifying the timescale of the multimedia content, and/or the like.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
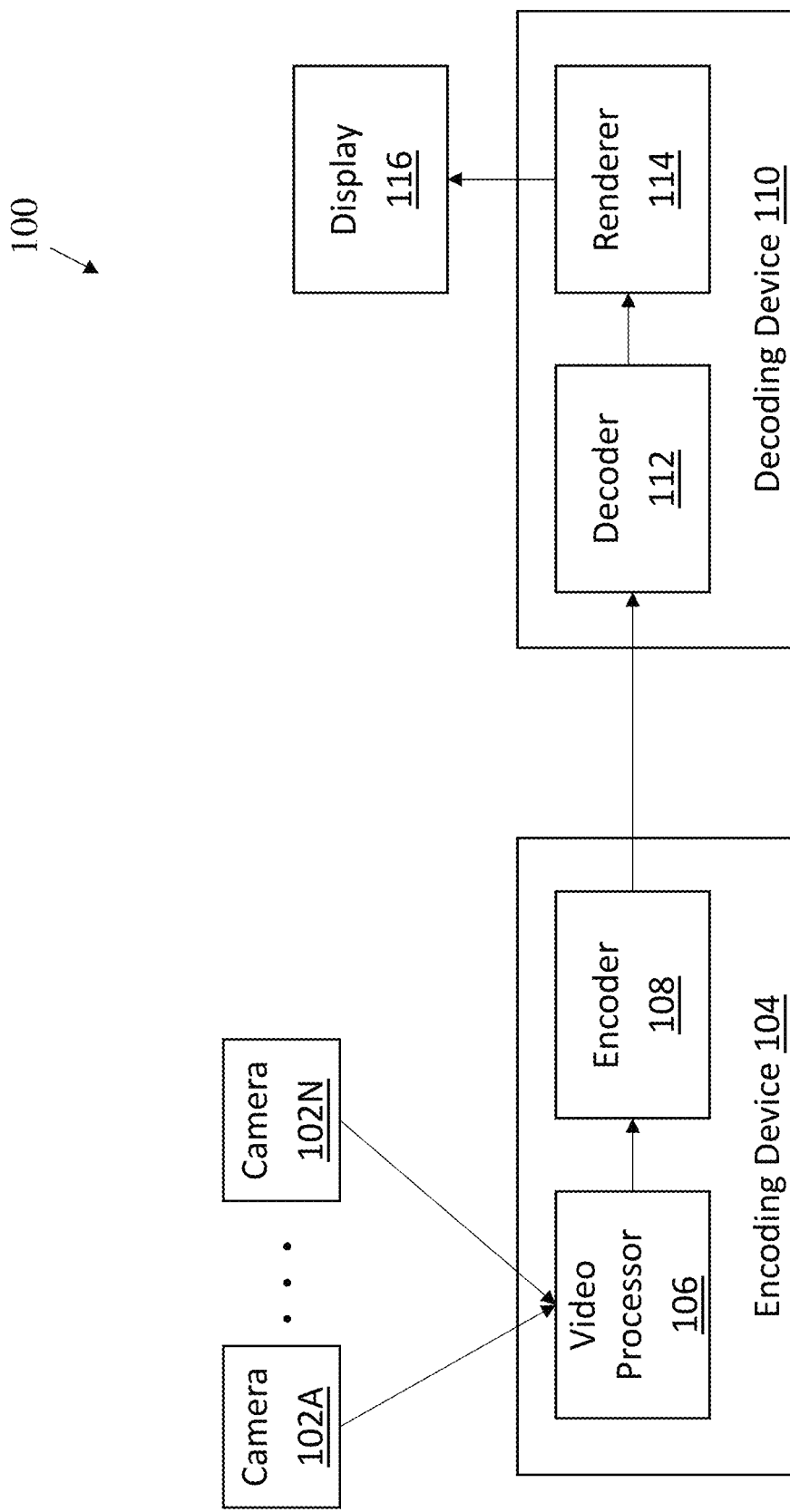
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
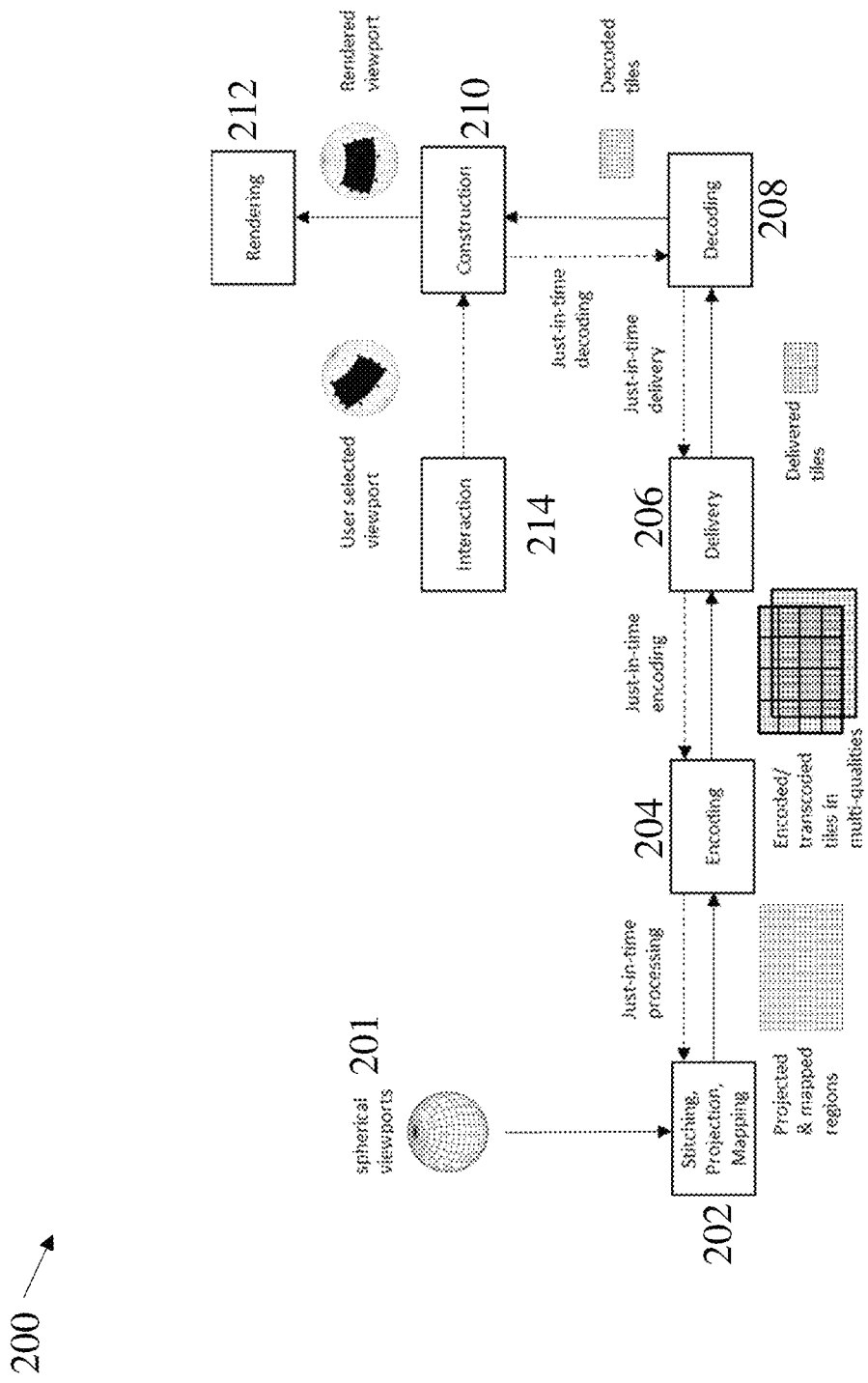
FIG. 2 shows a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
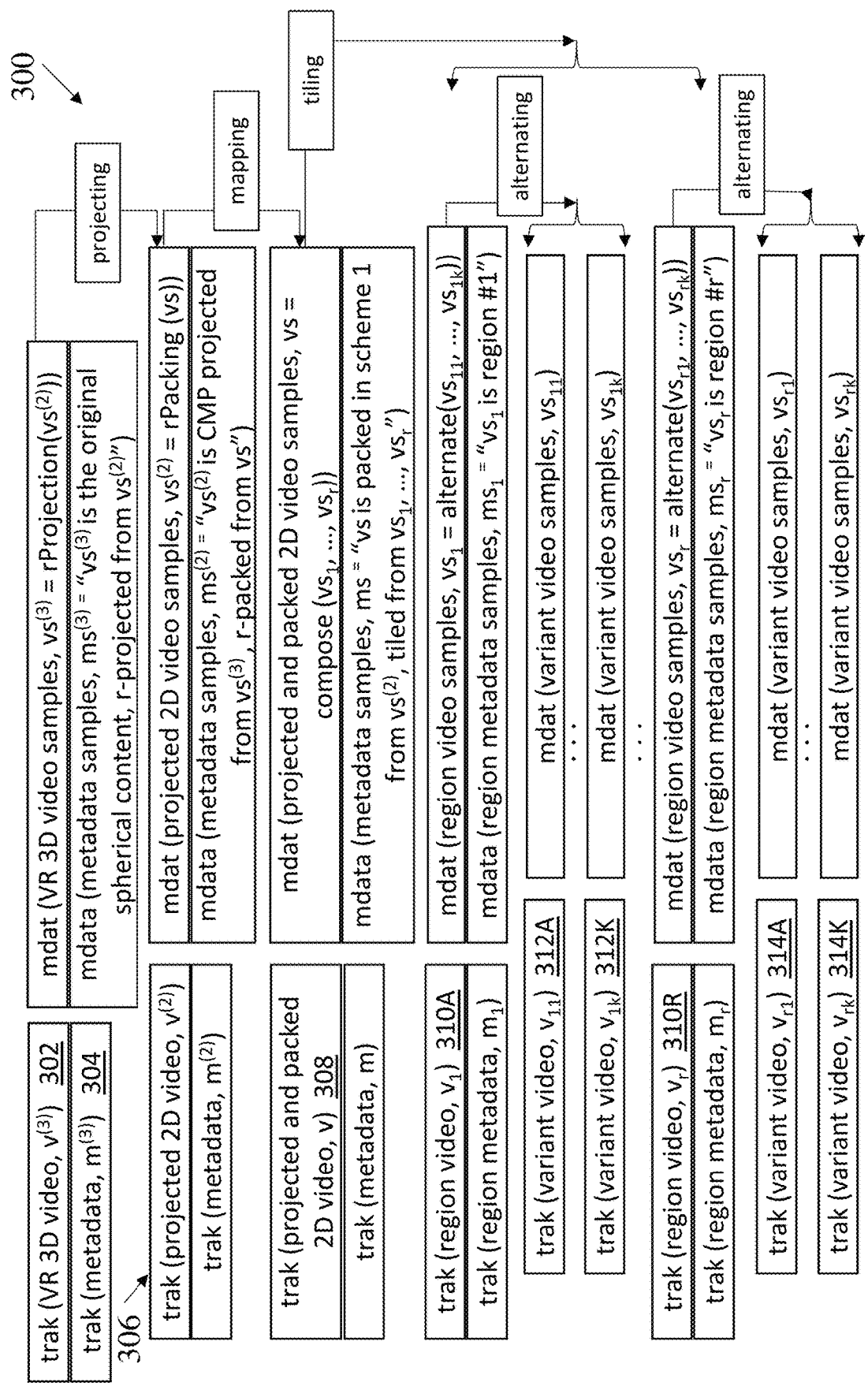
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118$^{th}$ meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

A derived visual track can be indicated by its containing sample entry of type 'dtrk'. A derived sample contains an ordered list of the operations to be performed on an ordered list of input images or samples. Each of the operations can be specified or indicated by a Transform Property. A derived visual sample is reconstructed by performing the specified operations in sequence. Examples of transform properties in ISOBMFF that can be used to specify a track derivation, including those in the latest ISOBMFF Technologies Under Consideration (TuC) (see, e.g., N17833, "Technologies under Consideration for ISOBMFF", July 2018, Ljubljana, SK, which is hereby incorporated by reference herein in its entirety), include: the 'idtt' (identity) transform property; the 'clap' (clean aperture) transform property; the 'srot' (rotation) transform property; the 'dslv' (dissolve) transform property; the '2dcc' (ROI crop) transform property; the 'tocp' (Track Overlay Composition) transform property; the 'tgcp' (Track Grid Composition) transform property; the 'tgmc' (Track Grid Composition using Matrix values) transform property; the 'tgsc' (Track Grid Sub-Picture Composition) transform property; the 'tmcp' (Transform Matrix Composition) transform property; the 'tgcp' (Track Grouping Composition) transform property; and the 'tmcp' (Track Grouping Composition using Matrix Values) transform property. All of these track derivations are related to spatial processing, including image manipulation and spatial composition of input tracks.

The techniques described herein improve existing track derivation technology by providing for temporal track derivations that process input tracks in the temporal domain. A derived track can include, for example, a temporal aspect, if the derived track includes temporal sequences of contiguous samples. As described herein, the contiguous samples can be in the input tracks, and can be in various forms, such as chucks, fragments, segments, sections, and/or the like. Examples of temporal track derivations include adding and/or removing multimedia content, modifying the speed of the multimedia content, modifying the timescale of the multimedia content, and other temporal operations that can be performed on multimedia content. Various examples of temporal track derivations are provided herein. It should be appreciated that such examples are provided for illustrative purposes and are not intended to be limiting.

The temporal track derivation techniques described herein can be useful in various multimedia processing scenarios, such as those that require adding and/or removing multimedia content. In some embodiments, temporal track derivations can be used for ad processing. For example, a splice derivation can used for deriving tracks representing pre-roll or post-roll insertion, and an insert derivation can be for middle-roll insertion. In some embodiments, temporal track derivations can be used to perform time-based processing using network-based resources. An example of such a media processing framework is proposed by the Network-Based Media Processing (NBMP) activity in N17502, "Use cases and requirements for NBMP (v4)", April 2018, San Diego, US, which is hereby incorporated by reference herein in its entirety. In some examples, the techniques described herein can be used with cloud-based media processing entities (MPEs) to perform the time-based track processing within the cloud, such as to perform ad-based processing in the cloud. Dynamic Adaptive Streaming over HTTP (DASH), for example, supports ad insertion at the manifest level when streaming multi-view multimedia. For example, a streaming manifest can specify different periods for the multimedia content and the ad content (e.g., two periods, one period for a pre-roll ad, and second period with the multimedia content). However, for such DASH configurations, the end-receiver performs the ad-based processing, which can cause undesired complexities, including consuming resources on the client device, requiring that the client device handle media in different formats, and/or the like. The techniques described herein provide for server-side ad insertion, such that tracks can be prepared for a client upstream of the client device, and therefore the client device does not need to be aware of and/or deal with aspects of the manifest.

Figure 4:
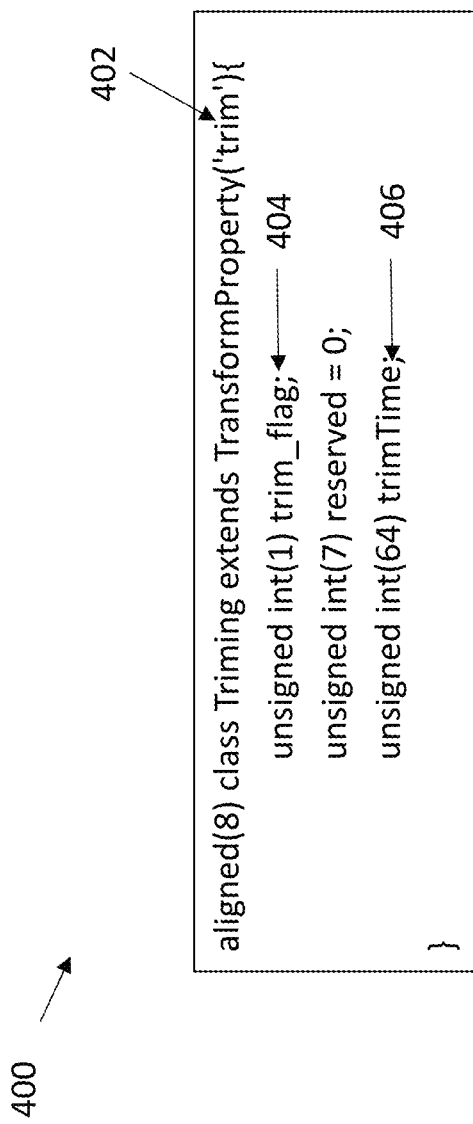
FIG. 4 shows an exemplary syntax for a trim temporal track derivation, according to some embodiments.

Temporal track derivations can be used to modify the multimedia content of input track(s), such as to add to and/or remove multimedia data from a multimedia clip. An example of such a temporal track derivation is a trim operation. A trim operation can be used to remove multimedia content, such as to remove content from the head and/or the tail of a multimedia clip. FIG. 4 shows an exemplary syntax 400 for a trim temporal track derivation, according to some embodiments. The trim track derivation can be an optional derivation that can be specified in any quantity per sample. In the exemplary syntax 400, the 'trim' transform property 402 provides information for the process of trimming an input track to derive a trimmed track. The 'trim' transform property 402, when present, can be used with one input track (e.g., num_inputs is equal to 1). Generally, the transform property can specify an indicator for the type of trim (e.g., head-trim or tail-trim), and a media time at which trimming happens before (e.g., for head-trim) or after (e.g., for tail-trim), inclusively. The trim_flag field 404 can specify an indicator for head-trim or tail-trim, such that a value of trim_flag 404 equal to 0 or 1 indicates that the trim is head-trim or tail-trim, respectively. The trimTime field 406 can be used to specify a media time (e.g., in the scale of the timescale of the input track) at which any sample in the media of the input track before or after this time is removed (e.g., trimmed) in the derived track, inclusively, depending on whether the trim is head-trim or tail-trim.

As noted, the syntaxes discussed herein, such as the syntax 400 in FIG. 4, are provided for exemplary purposes and are not intended to be limiting. Other naming conventions and/or syntaxes can be used to achieve the techniques described herein. For example, referring to the syntax 400, the trim transform property can be split into two transform properties, one for head-trim and the other for tail-trim, if more desirable than a combined transform property as shown in FIG. 4.

Figure 5:
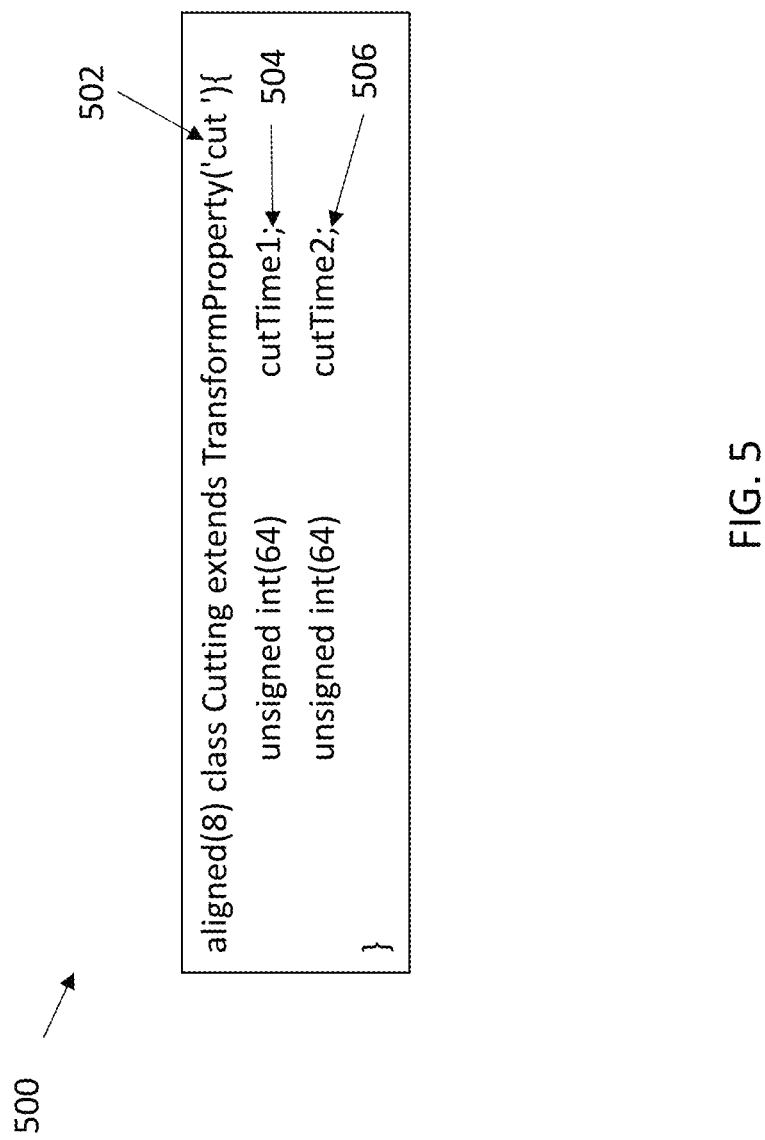
FIG. 5 shows an exemplary syntax for a cut track derivation, according to some embodiments.

Another exemplary temporal track derivation is a cut operation. A cut operation can be used to remove a section of the multimedia content. For example, a cut operation can remove a section of a video clip by essentially cutting the video clip in two places, removing the middle section of the video clip between the two cuts, and joining the leftover video. FIG. 5 shows an exemplary syntax 500 for a cut track derivation, according to some embodiments. The cut track derivation can be an optional derivation that can be specified in any quantity per sample. The exemplary syntax 500 includes a 'cut' transform property 502, which can provide information for the process of cutting an input track to derive a cut track. The 'cut' transform property can use one input track (e.g., num_inputs is equal to 1). Generally, the syntax 500 can specify two media times between which a cut happens, inclusively. The cutTime1 field 504 and the cutTime2 field 506 can be used to specify two media times (e.g., in the scale of the timescale of the input track), where cutTime1<=cutTime2. Any sample in the media of the input track in the closed time interval [cutTime1, cutTime2] is removed in the derived track.

A further example of a temporal track derivation is a splice operation. A splice operation can be used to join two video clips. The splice track derivation can be an optional derivation that can be specified in any quantity per sample. In some embodiments, a splice transform property (e.g., 'splc') can be used to provide information for splicing a number of input tracks to derive a spliced track. The derived track is the result of splicing the input tracks one after another in the order of the input tracks, and therefore the derived spliced track can have a duration that is equal to the sum of all durations of the input tracks. The splice transform property can be used for a plurality of input tracks (e.g., num_inputs is greater than one). In some embodiments, the splice transform property can assume that all of the input tracks have a same media type with a same timescale. In some embodiments, the input tracks need not share the same timescale. For example, if the timescales of the input tracks share a common denominator, then the timescale and duration of the derived track can be adjusted accordingly.

Figure 6:
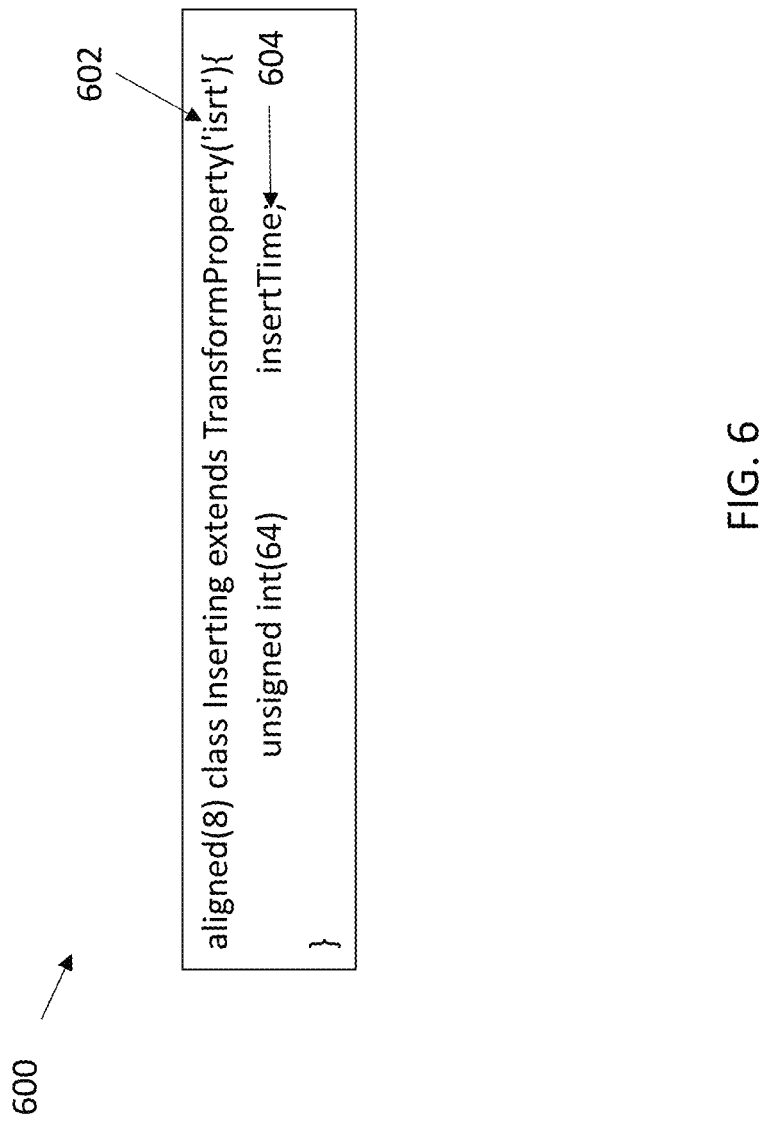
FIG. 6 shows an exemplary syntax for an insertion temporal track derivation, according to some embodiments.

Another example of a temporal track derivation is an insertion operation. An insertion operation can include splitting a first video into two sections, placing a second video (or a portion of a second video) in between the two sections of the first video, and joining the three sections together to insert the second video into the first video. FIG. 6 shows an exemplary syntax 600 for an insertion temporal track derivation, according to some embodiments. The insertion track derivation can be an optional derivation that can be specified in any quantity per sample. As shown in the exemplary syntax 600, the insert 'isrt' transform property 602 can provide information for the process of inserting an input track into another input track to derive an inserted track. The insert 'isrt' transform property can be used for two input tracks (e.g., num_inputs is equal to 2), where the two input tracks have a same timescale. Generally, the transform property can specify a media time where the insertion of the second input track happens to the first input track. The insertTime field 604 can specify a media time (in the scale of the timescale) of the first input track, at which the second input track is inserted.

Figure 7:
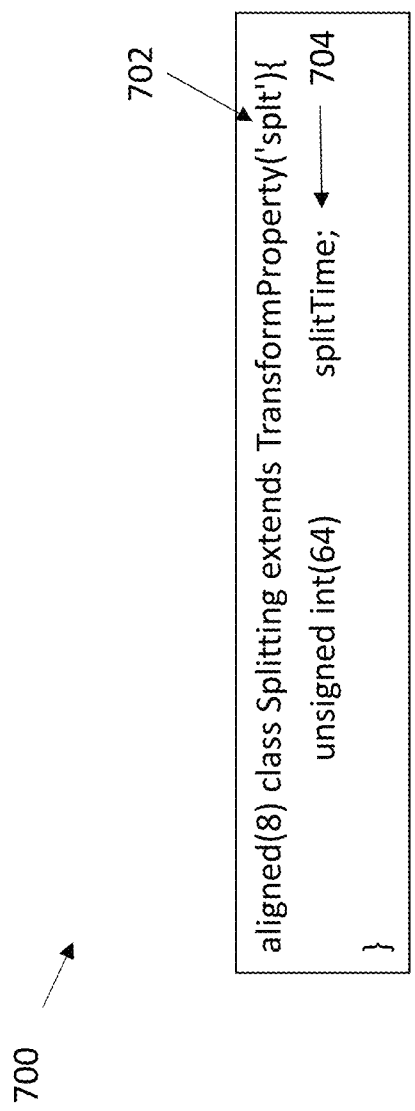
FIG. 7 shows an exemplary syntax for a split track derivation, according to some embodiments.

A further example of a temporal track derivation is a split operation. A split operation can be used, for example, to split a video into sections. For example, a long video can be cut into sections, such as to work with the sections separately. FIG. 7 shows an exemplary syntax 700 for a split track derivation, according to some embodiments. The split track derivation can be an optional derivation that can be specified in any quantity per sample. As shown in the syntax 700, the split 'splt' transform property 702 can provide information for the process of splitting an input track to derive two split tracks. The split 'splt' transform property can be used for one input track (e.g., num_inputs is equal to 1) to output two tracks (e.g., num_outputs is equal to 2). For example, m44800, "Media Processing related Track Derivations in ISOBMFF". October 2018. Macau, CN, which is hereby incorporated by reference in its entirety, describes expanding single output track derivations to multiple track derivations and track group derivations. Generally, the transform property can specify a media time in the input track at which the split happens. The splitTime field 704 can specify a media time (e.g., in the scale of the timescale) of the input track, at which split occurs where the first derived track contains all samples before the time, exclusively, and the second derived track contains all samples after the time, inclusively. While only one split time is shown in this example, a split transform property can be generalized to have "n" number of split times in the input track, which derives n+1 split tracks as the output.

In some embodiments, when performing a temporal track derivation, the media samples (e.g., media chunks, fragments, segments, sections, etc.) can be assigned different timestamps in derived tracks (e.g., such that a sample in the original input track has a different timestamp in the derived track). For example, for a trim operation that removes multimedia data from the head, where trimTime=n, the sample with timestamp n+m (m>=0) in the input track will be in the derived track with timestamp m. As another example, for a split operation, all samples with timestamps n, where n<splitTime, in the input track will become samples with the timestamps in the first output derived track, and all samples with timestamps m, m>=splitTime, in the input track will become samples with timestamps m-splitTime in the second output derived track.

Other forms of video editing can be specified as temporal track derivations that do not change the content itself, but change other aspects of the content, such as the speed and/or presentation aspects. An example of such a temporal track derivation is a slow-motion operation. A slow-motion operation can be used to provide an effect in media playback whereby time appears to be slowed down. The slow-motion operation can be achieved, for example, by making the playback speed of the temporal derived track slower than the playback speed of an input track.

Another example of a temporal track derivation is a fast-motion operation. A fast-motion operation can be used to provide an effect in media playback whereby time appears to be sped up. The fast-motion operation can be achieved, for example, by making the playback speed of the temporal derived track faster than the playback speed of an input track.

A further example of a temporal track derivation is a timescale operation. For example, a timescale increase or decrease operation can be used to increase or decrease the timescale of a multimedia clip. A timescale operation can be used to align the timescale of a multimedia clip with timescales of other tracks. For example, a timescale operation can be used in conjunction with a splice operation, as described herein.

The temporal track derivations can be specified using a transform property in a derived track. As described herein, a derived track can include a set of transform properties. Therefore, the temporal techniques described herein can be used in conjunction with spatial transforms. For example, a derived track can specify a temporal transform property and a spatial transform property (in that order), and a temporal transform can be performed first, and then a spatial transform. As another example, different levels of the track hierarchy can perform different types of track derivations. For example, a first derived track can be generated using temporal and/or spatial transforms, and that can be used as an input track to derive another track using temporal and/or spatial transforms.

Figure 8:
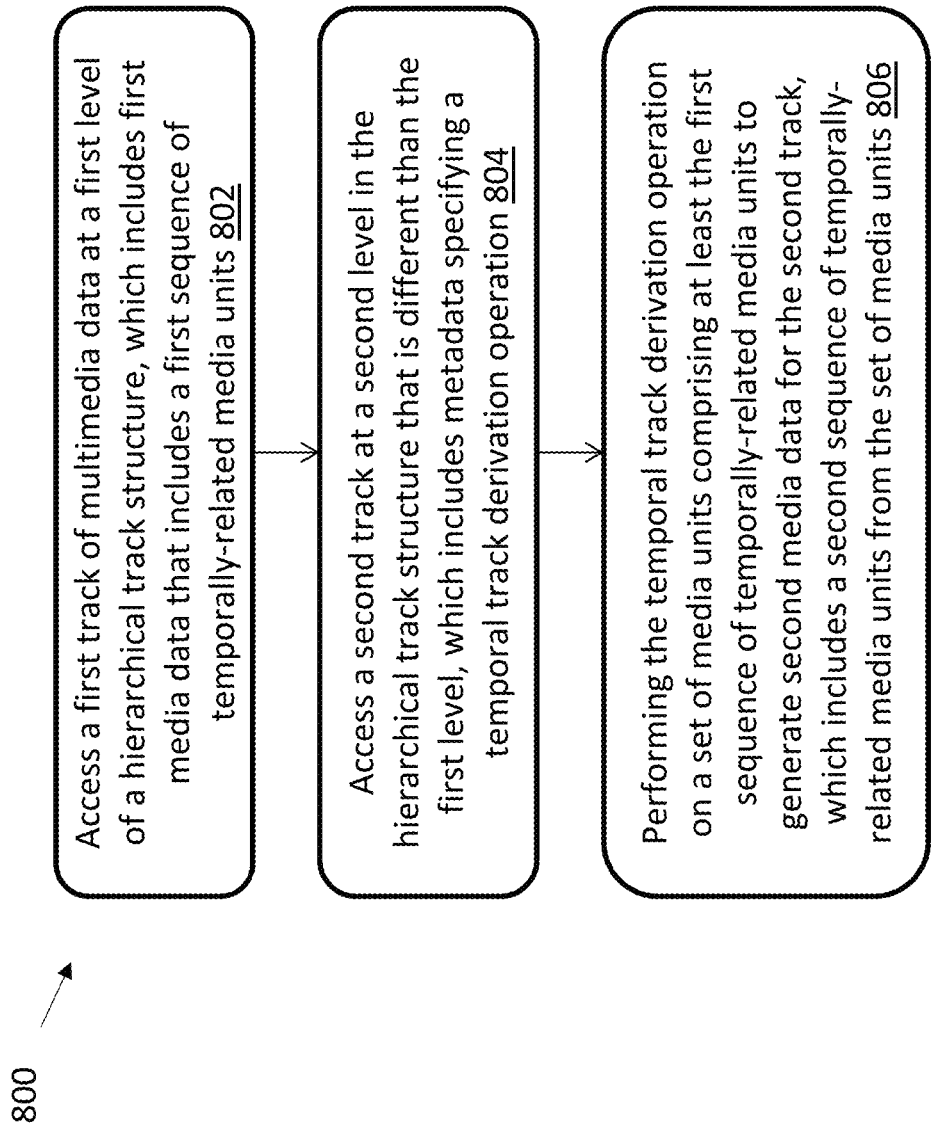
FIG. 8 shows an exemplary computerized method for performing a temporal track derivation, according to some embodiments.

FIG. 8 shows an exemplary computerized method 800 for performing a temporal track derivation, according to some embodiments. At steps 802 and 804, the computing device (e.g., the encoding device 104 or the decoding device 110) receives multimedia data that has a hierarchical track structure. In particular, at step 802, the computing device receives a first track at a first level of the hierarchical track structure that includes first media data, which can be, for example, one or more input tracks. The media data of each input track comprises a temporally-related sequence of media units, such that each media unit is associated with a different time than other media units in the temporally-related sequence. At step 804, the computing device receives a second track at a second level in the hierarchical track structure that is different than the first level of the first track. The second track includes metadata specifying a temporal track derivation operation (e.g., trim, cut, slow-motion, etc.). While steps 802 and 804 are shown as separate steps, it should be appreciated that the input track(s) and the track specifying the temporal track derivation operation can be received in one or a plurality of steps.

At step 806, the computing device performs the temporal track derivation operation on a set of media units that includes at least the first sequence of temporally-related media units to generate second media data for the second track. The second media data includes a second sequence of temporally-related media units from the set of media units. By virtue of performing the temporal operation, the second media data has a temporal modification (e.g., compared to the first media data), and therefore the second media data is different than the first media data. As described herein, such a temporal modification can include adding and/or removing multimedia content and/or changing other temporal aspects of the multimedia data, such as modifying the speed and/or timescale of the multimedia content.

In some embodiments as described herein, the metadata can specify an operation to add media data to an input track. Generally, to add media data, the computing device accesses a second input track (e.g., a third track) that includes new media data with a new temporally-related sequence of media units, and the temporal track derivation operation includes combining the first media data and the new media data to generate the second media data. For example, if the metadata specifies a splicing operation, the computing device performs the temporal track derivation operation by joining the first media data and the third media data. As another example, if the metadata specifies an insertion operation that includes an insertion time, the computing device performs the temporal track derivation operation by splitting the first media data at the insertion time into a first portion and a second portion, and joining the first portion, the third media data, and the second portion, so that the third media data is between the first portion and the second portion.

In some embodiments as described herein, the metadata can specify an operation to remove media data. The computing device can perform the temporal track derivation operation by removing a portion of the first media data to generate the second media data. For example, the metadata can specify a trim operation that includes a trim time specifying an amount of media data, and the computing device can perform the temporal track derivation operation by removing the amount of media data from a beginning portion or an end portion of the first media data. As another example, the metadata can specify a cut operation that includes a first and second cut time, and the computing device can perform the temporal track derivation operation by removing a middle portion of the first media data between the first and second cut times.

In some embodiments as described herein, the temporal track derivation can generate a plurality of derived tracks. For example, the computing device can generate, in addition to the second media data for the second track, third media data for a third track (and optionally further media data for further tracks). For a split operation that includes a split time, for example, the computing device can split the first media data at the split time into a first portion and a second portion, such that the second media data includes the first portion and the third media data includes the second portion.

In some embodiments as described herein, the temporal track derivation operation can perform modifications to the timing of an input track. For example, the metadata can specify a time change operation, such as changing the speed and/or timescale of the media data, and the computing device can performing the temporal track derivation operation to change a time aspect of the first media data (e.g., speeding up the first media data, slowing down the first media data, changing the time scale of the first media data, and/or the like).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method implemented by at least one processor in communication with a memory, wherein the memory stores computer-readable instructions that, when executed by the at least one processor, cause the at least one processor to perform:
    accessing multimedia data comprising a hierarchical track structure comprising at least:
        a first track at a first level of the hierarchical track structure comprising first media data, wherein the first media data comprises a first sequence of temporally-related media units; and
        a second track at a second level in the hierarchical track structure that is different than the first level of the first track, wherein:
            the second track comprises metadata specifying a temporal track derivation operation that specifies a temporal modification to perform on a set of media units comprising at least the first sequence of temporally-related media units; and
            the second track does not include media data prior to performing the temporal track derivation operation; and
    performing the temporal track derivation operation on the set of media units to perform the temporal modification to temporally modify the set of media units to generate second media data, wherein:

the second media data comprises a second sequence of temporally-related media units from the set of media units; and the second sequence of temporally-related media units comprises at least one temporal difference from the first sequence of temporally-related media units due to performing the temporal modification.

2. The method of claim 1, wherein:

the metadata specifies an operation to add media data;

the hierarchical track structure further comprises a third track at a third level below the second level comprising third media data, wherein the third media data comprises a third sequence of temporally-related media units;

the set of media units further comprises the third sequence of temporally-related media units; and said performing the temporal track derivation operation on the set of media units comprises combining the first sequence of temporally-related media units and the third sequence of temporally-related media units to generate the second sequence of temporally-related media units.

3. The method of claim 2, wherein the metadata specifies a splicing operation, and said combining comprises joining the first sequence of temporally-related media units and the third sequence of temporally-related media units to generate the second sequence of temporally-related media units.

4. The method of claim 2, wherein the metadata specifies an insertion operation comprising an insertion time, and said combining comprises:

splitting the first sequence of temporally-related media units at the insertion time into a first portion and a second portion; and joining the first portion, the third sequence of temporally-related media units, and the second portion, so that the third sequence of temporally-related media units is between the first portion and the second portion.

5. The method of claim 1, wherein the metadata specifies an operation to remove a set of one or more media units, and said performing the temporal track derivation operation on the set of media units comprises removing the set of one or more media units from the first sequence of temporally-related media units to generate the second sequence of temporally-related media units.

6. The method of claim 5, wherein the metadata specifies a trim operation comprising a trim time specifying the set of one or more media units, and said removing the set of one or more media units from the first sequence of temporally-related media units comprises removing the set of one or more media units from a beginning portion or an end portion of the first sequence of temporally-related media units.

7. The method of claim 5, wherein the metadata specifies a cut operation comprising a first and second cut time, and said removing the set of one or more media units from the first sequence of temporally-related media units comprises removing the set of one or more media units from a middle portion of the first sequence of temporally-related media units between the first and second cut times.

8. The method of claim 1, wherein said performing the temporal track derivation operation on the set of media units comprises generating third media data for a third track, the third media data comprising a third sequence of temporally-related media units.

9. The method of claim 8, wherein the metadata specifies a split operation comprising a split time, and said generating the second media data and the third media data comprises splitting the first sequence of temporally-related media units at the split time into a first portion and a second portion, wherein the second media data comprises the first portion and the third media data comprises the second portion.

10. The method of claim 1, wherein the metadata specifies a time change operation; and said performing the temporal track derivation operation on the set of media units comprises changing a time aspect of the first sequence of temporally-related media units to generate the second sequence of temporally-related media units.

11. The method of claim 1, wherein performing the temporal track derivation so that the second sequence of temporally-related media units comprises the at least one temporal difference from the first sequence of temporally-related media units comprises:

removing at least some of the first sequence of temporally-related media units to generate the second sequence of temporally-related media units;

adding an additional set of media units to the first sequence of temporally-related media units to generate the second sequence of temporally-related media units;

modifying a first playback speed of the first sequence of temporally-related media units to generate a second playback speed of the second sequence of temporally-related media units that is different than the first playback speed; or some combination thereof.

12. An apparatus comprising a processor in communication with memory, the processor being configured to execute instructions stored in the memory that cause the processor to perform:

accessing multimedia data comprising a hierarchical track structure comprising at least:

a first track at a first level of the hierarchical track structure comprising first media data, wherein the first media data comprises a first sequence of temporally-related media units; and a second track at a second level in the hierarchical track structure that is different than the first level of the first track, wherein:

the second track comprises metadata specifying a temporal track derivation operation that specifies a temporal modification to perform on a set of media units comprising at least the first sequence of temporally-related media units; and the second track does not include media data prior to performing the temporal track derivation operation; and performing the temporal track derivation operation on the set of media units to perform the temporal modification to temporally modify the set of media units to generate second media data, wherein:

the second media data comprises a second sequence of temporally-related media units from the set of media units; and the second sequence of temporally-related media units comprises at least one temporal difference from the first sequence of temporally-related media units due to performing the temporal modification.

13. The apparatus of claim 12, wherein:

the metadata specifies an operation to add media data;

the hierarchical track structure further comprises a third track at a third level below the second level comprising third media data, wherein the third media data comprises a third sequence of temporally-related media units;

the set of media units further comprises the third sequence of temporally-related media units; and said performing the temporal track derivation operation on the set of media units comprises combining the first sequence of temporally-related media units and the third sequence of temporally-related media units to generate the second sequence of temporally-related media units.

14. The apparatus of claim 13, wherein the metadata specifies a splicing operation, and said combining comprises joining the first sequence of temporally-related media units and the third sequence of temporally-related media units to generate the second sequence of temporally-related media units.

15. The apparatus of claim 13, wherein the metadata specifies an insertion operation comprising an insertion time, and said combining comprises:

splitting the first sequence of temporally-related media units at the insertion time into a first portion and a second portion; and joining the first portion, the third sequence of temporally-related media units, and the second portion, so that the third sequence of temporally-related media units is between the first portion and the second portion.

16. The apparatus of claim 12, wherein the metadata specifies an operation to remove a set of one or more media units, and said performing the temporal track derivation operation on the set of media units comprises removing the set of one or more media units from the first sequence of temporally-related media units to generate the second sequence of temporally-related media units.

17. The apparatus of claim 16, wherein the metadata specifies a trim operation comprising a trim time specifying the set of one or more media units, and said removing the set of one or more media units from the first sequence of temporally-related media units comprises removing the set of one or more media units from a beginning portion or an end portion of the first sequence of temporally-related media units.

18. The apparatus of claim 16, wherein the metadata specifies a cut operation comprising a first and second cut time, and said removing the set of one or more media units from the first sequence of temporally-related media units comprises removing the set of one or more media units from a middle portion of the first sequence of temporally-related media units between the first and second cut times.

19. The apparatus of claim 12, wherein said performing the temporal track derivation operation on the set of media units comprises generating third media data for a third track, the third media data comprising a third sequence of temporally-related media units.

20. The apparatus of claim 19, wherein the metadata specifies a split operation comprising a split time, and said generating the second media data and the third media data comprises splitting the first sequence of temporally-related media units at the split time into a first portion and a second portion, wherein the second media data comprises the first portion and the third media data comprises the second portion.

21. The apparatus of claim 12, wherein the metadata specifies a time change operation; and said performing the temporal track derivation operation on the set of media units comprises changing a time aspect of the first sequence of temporally-related media units to generate the second sequence of temporally-related media units.

22. At least one non-transitory computer readable storage medium storing processor-executable instructions that, when executed by at least one processor, cause the at least one processor to perform:

accessing multimedia data comprising a hierarchical track structure comprising at least:

a first track at a first level of the hierarchical track structure comprising first media data, wherein the first media data comprises a first sequence of temporally-related media units; and a second track at a second level in the hierarchical track structure that is different than the first level of the first track, wherein:

the second track comprising metadata specifying a temporal track derivation operation that specifies a temporal modification to perform on a set of media units comprising at least the first sequence of temporally-related media units; and the second track does not include media data prior to performing the temporal track derivation operation; and performing the temporal track derivation operation on the set of media units to perform the temporal modification to temporally modify the set of media units to generate second media data, wherein:

the second media data comprises a second sequence of temporally-related media units from the set of media units; and the second sequence of temporally-related media units comprises at least one temporal difference from the first sequence of temporally-related media units due to performing the temporal modification.

* * * * *